(12) United States Patent
Baba et al.

(10) Patent No.: US 7,697,769 B2
(45) Date of Patent: *Apr. 13, 2010

(54) INTERPOLATION IMAGE GENERATING METHOD AND APPARATUS

(75) Inventors: Masahiro Baba, Yokohama (JP); Nao Mishima, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 18 days.

This patent is subject to a terminal disclaimer.

(21) Appl. No.: 11/965,463

(22) Filed: Dec. 27, 2007

(65) Prior Publication Data

US 2009/0129688 A1 May 21, 2009

Related U.S. Application Data

(63) Continuation of application No. 11/032,167, filed on Jan. 11, 2005, now Pat. No. 7,343,044.

(30) Foreign Application Priority Data

Jan. 15, 2004 (JP) .............................. 2004-008268

(51) Int. Cl.
*G06K 9/36* (2006.01)
*G06K 9/32* (2006.01)
*G06K 9/46* (2006.01)

(52) U.S. Cl. ....................................... 382/236; 382/300

(58) Field of Classification Search ................. 382/164, 382/172, 173, 218–220, 232, 233, 236, 253–254, 382/272, 284, 300; 375/240.12–240.14, 375/240.16, 240.22; 348/441, 443, 447, 348/452, 459, 699, 700; 345/606, 699; 358/428, 358/525

See application file for complete search history.

(56) References Cited

U.S. PATENT DOCUMENTS

| 4,862,267 A | * | 8/1989 | Gillard et al. ................ 348/443 |
| 4,958,226 A | * | 9/1990 | Haskell et al. .......... 375/240.12 |
| 5,410,356 A | * | 4/1995 | Kikuchi et al. .............. 348/452 |
| 5,546,130 A | * | 8/1996 | Hackett et al. .............. 348/447 |
| 5,592,226 A | * | 1/1997 | Lee et al. ................ 375/240.14 |

(Continued)

FOREIGN PATENT DOCUMENTS

JP          6-54302         2/1994

(Continued)

*Primary Examiner*—Amir Alavi
(74) *Attorney, Agent, or Firm*—Oblon, Spivak, McClelland, Maier & Neustadt, L.L.P.

(57) ABSTRACT

An interpolation image generating method includes dividing each of the first reference image and the second reference image into reference regions each including pixels, executing a correlation operation between the first reference image and first destination images located before and after the first reference image and a correlation operation between the second reference image and a second destination image to derive motion vectors for the first and second destination images every reference region, obtaining correlation values between the regions of the first and second destination images that are indicated by the motion vectors and the reference region to determine the reference region as a high or low correlation region, generating an interpolation image candidate between the first reference and second images using the reference region determined as the high correlation region, and mixing the interpolation image candidates using the motion vectors of the reference region to produce an interpolation image.

11 Claims, 11 Drawing Sheets

U.S. PATENT DOCUMENTS

| | | | |
|---|---|---|---|
| 5,600,377 A * | 2/1997 | David et al. | 348/452 |
| 5,699,499 A * | 12/1997 | Kawada et al. | 345/475 |
| 6,058,212 A * | 5/2000 | Yokoyama | 382/236 |
| 6,327,391 B1 | 12/2001 | Ohnishi et al. | |
| 6,385,245 B1 * | 5/2002 | De Haan et al. | 375/240.16 |
| 6,606,126 B1 * | 8/2003 | Lim et al. | 348/452 |
| 6,625,333 B1 | 9/2003 | Wang et al. | |
| 6,628,827 B1 | 9/2003 | Acharya | |
| 6,744,931 B2 | 6/2004 | Komiya et al. | |
| 6,795,577 B2 | 9/2004 | Amonou | |
| 7,343,044 B2 * | 3/2008 | Baba et al. | 382/236 |
| 2003/0103567 A1 | 6/2003 | Riemens et al. | |
| 2004/0086193 A1 | 5/2004 | Kameyama et al. | |
| 2004/0240551 A1 | 12/2004 | Itoh et al. | |
| 2004/0246374 A1 * | 12/2004 | Mishima et al. | 348/441 |
| 2006/0193535 A1 * | 8/2006 | Mishima et al. | 382/294 |
| 2009/0067728 A1 * | 3/2009 | Mishima et al. | 382/218 |
| 2009/0129688 A1 * | 5/2009 | Baba et al. | 382/236 |
| 2009/0244389 A1 * | 10/2009 | Mishima et al. | 348/699 |

FOREIGN PATENT DOCUMENTS

| | | |
|---|---|---|
| JP | 9-214899 | 8/1997 |
| JP | 11-112940 | 4/1999 |
| JP | 2000-224593 | 8/2000 |
| JP | 2003-47011 | 2/2003 |

* cited by examiner

INTERPOLATION IMAGE GENERATING METHOD AND APPARATUS

CROSS-REFERENCE TO RELATED APPLICATIONS

This application is a Continuation of and claims the benefit of priority under 35 U.S.C. §120 from U.S. Ser. No. 11/032,167, filed Jan. 11, 2005 now U.S. Pat. No. 7,343,044, and claims the benefit of priority from prior Japanese Patent Application No. 2004-008268, filed Jan. 15, 2004, the entire contents of which are incorporated herein by reference.

BACKGROUND OF THE INVENTION

1. Field of the Invention

The present invention relates to an interpolation image generating method of generating an interpolation image between a first reference image and a second reference image and an apparatus therefor.

2. Description of the Related Art

In recent years, opportunities displaying a video image on various displays such as a cathode ray-tube (CRT), a liquid crystal display (LCD), and an organic electroluminescence display (EL Display) have been increasing. These displays are divided into a hold type display and an impulse type display by a displaying method. In the hold type display such as LCD and EL display, a certain frame of a displayed video image is held during one frame period. Therefore, even if a viewer watches a moving object while he or she follows the moving object smoothly, because the moving object moves discontinuously every frame period, the moving object is recognized as a blurred image by the viewer due to deviation between a smooth movement of the eyeshot of the viewer and a discontinuous movement of the displayed moving object. Generally this is called moving image degradation due to a hold effect.

The video image has various frame rates depending on its uses. Also, a display has various frame rates, so that the frame rate of the video image must be converted according to a display to display the video image. For example, the movie has 24 frames per second (24 fps). A pull down conversion is used for displaying the movie on a display device having a refresh rate of 60 Hz. This simply converts a frame rate by displaying the same frame two or three times. However, in the above method, since the number of frames of the video image is insufficient, the movement of the object becomes discontinuity unnaturally, resulting in jerky motion.

It is necessary for solving the above problem to increase the number of frames by producing a new interpolation frame according to movement of the moving image. As a method of generating an interpolation frame, there are a method of deriving a motion vector of a block by the block matching that is used by, for example, MPEG (Motion Picture Experts Group), and generating an interpolation frame using it, and a method of doing a motion vector search using a block and thereafter searching a peripheral of a motion vector of a block reference with a pixel level so as to be able to correspond to smaller movement (referring to Japanese Patent Laid-Open No. 11-112940, for example).

As discussed above, a method of generating an interpolation frame using a motion vector between two frames cannot obtain a correct motion vector in a hidden surface (occlusion) region.

An object of the present invention is to provide an interpolation image generation method of generating a correct interpolation image on an occlusion region.

BRIEF SUMMARY OF THE INVENTION

An aspect of the present invention provides an interpolation image generation method of generating an interpolation image between a first reference image of an input video and a second reference image thereof, comprising: dividing each of the first reference image and the second reference image into a plurality of reference regions each including a plurality of pixels, executing a correlation operation between the first reference image and each of at least two first destination images located before and after the first reference image in terms of time and a correlation operation between the second reference image and at least one second destination image corresponding to the second reference image to derive a plurality of motion vectors between the first destination image and the second destination image for each of the reference regions; obtaining a correlation value between the reference region and a corresponding region of at least one of the first destination images and the second destination image that is indicated by each of the motion vectors to determine the reference region as a high correlation region or a low correlation region; generating interpolation image candidates between the first reference image and the second reference image using the reference region determined as the high correlation region; and mixing the plurality of interpolation image candidates by means of the plurality of motion vectors to produce an interpolation image.

DETAILED DESCRIPTION OF THE INVENTION

The First Embodiment

Figure 1:
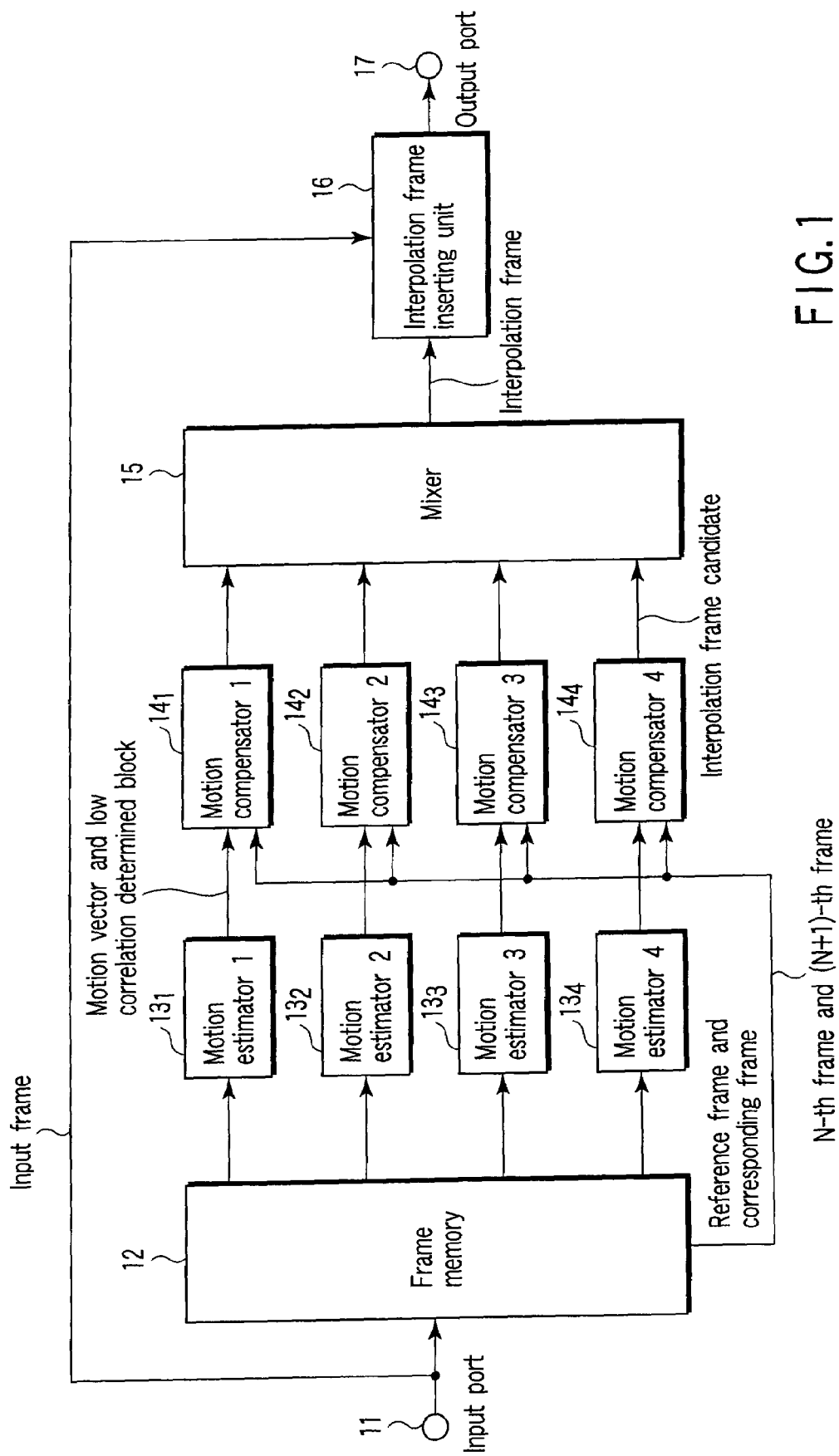
FIG. 1 is a block circuit diagram of an interpolation frame generating apparatus executing an interpolation frame generating method of a first embodiment.

FIG. 1 shows a block circuit of an interpolation frame generating apparatus implementing an interpolation image generating method according to the first embodiment of the present invention.

According to this interpolation frame generating apparatus, a frame memory 12 storing a video image input from an input port 11 is connected to input ports of a plurality of motion estimators 13, that is, four motion estimator $13_1$-$13_4$. A frame video image from the frame memory 12 is input to the input ports of the motion estimator $13_1$-$13_4$. The output ports of the motion estimators 131-134 are connected to the input ports of a plurality of motion compensator 14, that is, four motion compensators $14_1$-$14_4$. The output port of the motion compensators $14_1$-$14_4$ are connected to a mixer 15. The mixer 15 mixes interpolation frame candidates from the motion compensators $14_1$-$14_4$ and outputs an interpolation frame to an interpolation frame inserting unit 16. The interpolation frame inserting unit 16 outputs an interpolation frame image to an output port 17.

Figure 2:
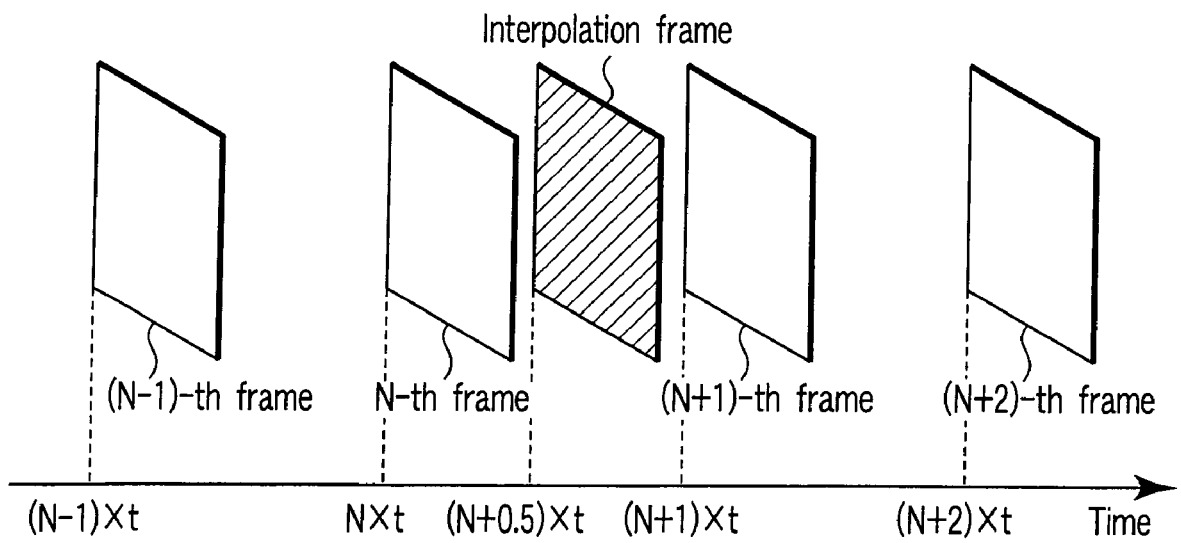
FIG. 2 is a diagram showing a relation between an interpolation frame and an input frame in the first embodiment.

There is described an operation of the above interpolation frame generating apparatus in the case that an interpolation frame I is produced at a temporal middle position between the N-th frame and the (N+1)-th frame of an input video image in conjunction with FIG. 2. The symbol t of FIG. 2 shows a frame-to-frame time interval (1/60 sec. in 60 fps, and 1/30 sec. in 30 fps). In other words, if an input video image is 30 fps, it is converted into 60 fps, and if it is 60 fps, it is converted into 120 fps.

The video image from the input port 11 is stored in the frame memory 12. Each of the motion estimators $13_1$, $13_2$, $13_3$ and $13_4$ read two frames used for doing a motion estimation from the frame memory 12, and executes the motion estimation. In the present embodiment, four motion estimators are used, but the number of motion estimators is not limited to four.

Figure 3:
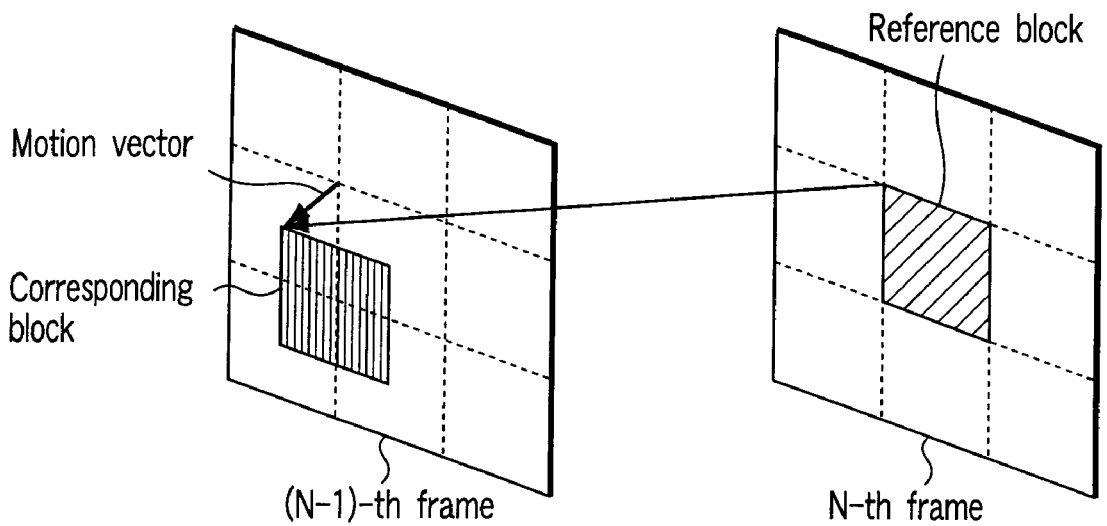
FIG. 3 is a diagram showing a general idea of block matching.

The motion estimator $13_1$ performs a motion estimation from the N-th frame to the (N−1)-th frame, and the motion estimator $13_2$ performs a motion estimation from the N-th frame to (N+1)-th frame. The motion estimator $13_3$ performs a motion estimation from the (N+1)-th to the N-th frame, and the motion estimator $13_4$ performs a motion estimation from the (N+1)-th frame to the (N+2)-th frame. The motion estimation technique is assumed a block matching as shown in FIG. 3. In other words, a frame as a reference for the motion estimation (the N-th frame if it is a motion estimation from the N-th frame to the (N−1)-th frame) is divided into a plurality of regions (blocks in the present embodiment) each including a plurality of pixels. Each block is assumed a reference block.

A block having the highest correlation with respect to a reference block on a search destination frame for the motion estimation (the (N−1)-th frame if it is a motion estimation from the N-th frame to the (N−1)-th) is searched for obtaining a corresponding block (hereinafter, the frame becoming a reference for motion search is referred to as a reference frame, and a frame of a search destination to as a corresponding frame). A spatial vector between the reference block and the corresponding block becomes a motion vector. The motion compensators $14_1$-$14_4$ each read from the frame memory 12 forward and backward frames between which an interpolation frame candidate is to be interpolated, and generate interpolation frame candidates using motion vectors derived by the motion estimators $13_1$-$13_4$. The generated interpolation frame candidates are input to the mixer 15 and mixed to produce an interpolation frame. At the last, the interpolation frame produced by the mixer 15 is interpolated at a target frame position of the input video image by the interpolation frame inserting unit 16.

Figure 4:
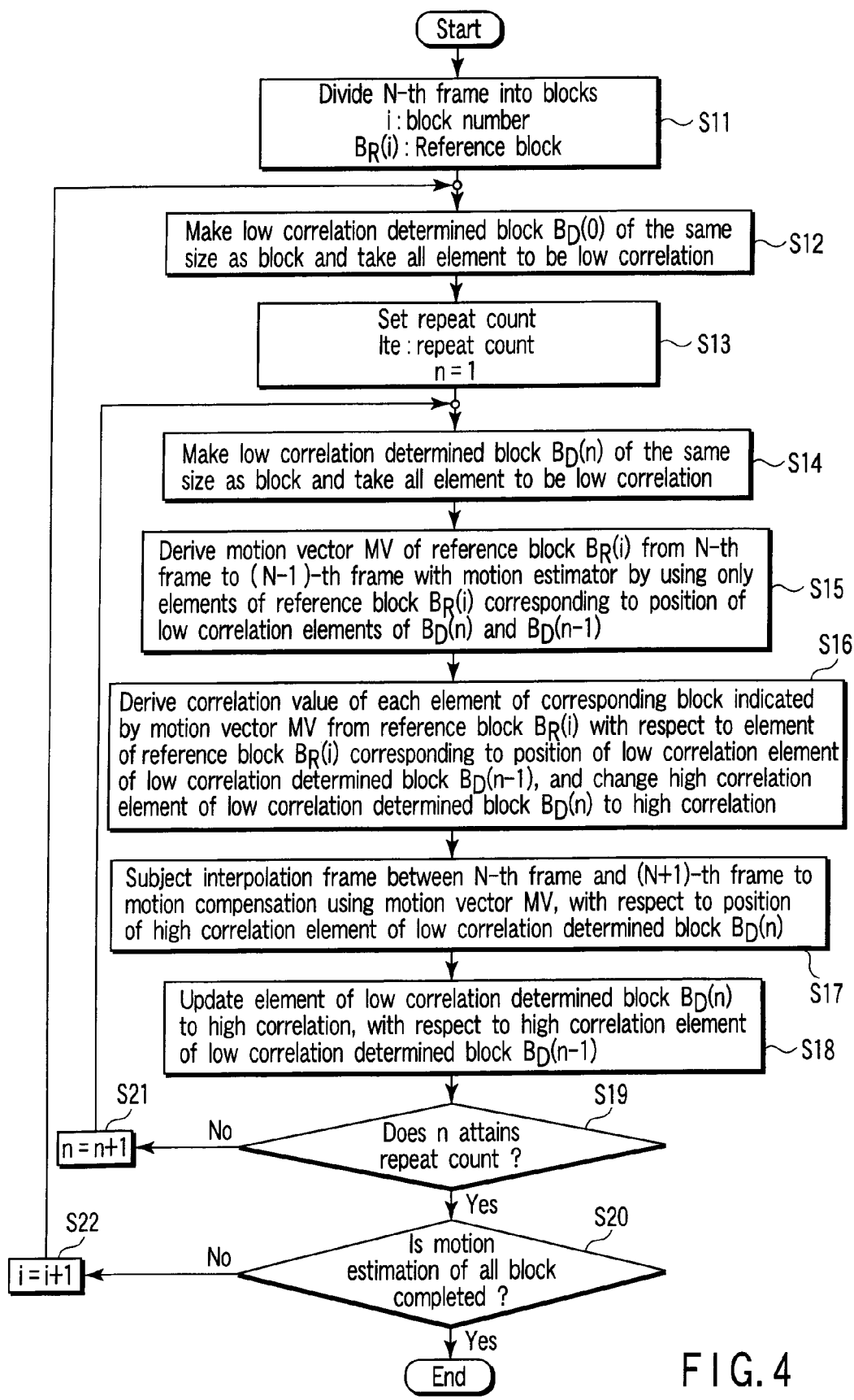
FIG. 4 is a flowchart indicating an operation of a motion estimation unit and a motion compensation unit in the first embodiment.

A flow from the motion estimators $13_1$-$13_4$ to the motion compensators $14_1$-$14_4$ is shown in FIG. 4. FIG. 4 shows a flow for performing a motion estimation by the motion estimator $13_1$, namely a motion estimation from the N-th frame to the (N−1)-th frame, and generating an interpolation frame candidate between the N-th frame and the (N+1)-th frame. The other motion estimators $13_2$-$13_4$ differ in the reference frame from the motion estimator $13_1$, but can execute the processing similar to that of the motion estimator $13_1$.

The input frame is divided into blocks each including a plurality of pixels in the block division step S11 (reference block: $B_R(i)$, i indicates a block number). The block may be any kind of shape. In the present embodiment, the block is formed of a square region wherein vertical and horizontal pixels are 16×16 pixels.

In the step S12 of initializing the low correlation determined block, the low correlation determined block $B_D(0)$ of the same size as the reference block is generated, and all pixels of the block are assumed "low correlation". In the present embodiment, since the reference block is a square region of 16×16 pixels, the low correlation determined block becomes a square region of 16×16 pixels, too. The low correlation determined block is a block derived by obtaining a correlation between the reference block and the corresponding block for each pixel, and determining as "high correlation" the pixel of the low correlation determined block that is located at a position of a pixel having a high correlation and as "low correlation" the pixel of the low correlation determined block that is located at a position of a pixel having a low correlation. The detail of the correlation determining step will be described hereinafter. Since the low correlation determined block may hold high correlation or low correlation information in each pixel, it may be one capable of holding one-bit information in each pixel.

In the step S13 of setting the number of repetition times, the number of repetition times Item of processes from the motion estimation step S15 to the motion compensation step S17 is set. In other words, in the present embodiment, a block is divided into a high correlation region and a low correlation region by computing every pixel a correlation between the reference block and the corresponding block, and a recursive process of subjecting the low correlation region to further motion estimation is done. The number of times of the recursive process is set. If the number of repetition times is set to, for example, 2, the steps after the step S14 is repeated twice. In the present embodiment, the number of repetition times is set to 2, and at the same time the count n indicating the current number of repetition times is set to 1.

In the step S14 of generating a correlation determined block, the low correlation determined block $B_D(n)$ in the number of each repetition is generated, and all pixels are assumed "low correlation". This step is similar to the step of initializing the low correlation determined block.

In the motion estimation step S15, only the pixels of the reference block corresponding to the position of the pixel that is "low correlation" in the low correlation determined block $B_D(n-1)$ and the pixel that is "low correlation" in the low correlation determined block $B_D(n)$ are subjected to correlation operation to obtain a motion vector MV from the N-th frame to the (N−1)-th frame. A method of obtaining the motion vector MV is a method of obtaining the position (motion vector) of the block on the (N−1)-th frame that is the highest correlation with respect to a reference block on the N-th frame as shown in FIG. 3 in the present embodiment, that is, a so-called block matching from the N-th frame to the (N−1)-th frame. A sum of absolute difference (SAD), a maximum matching pel count (MPC), etc. are conceivable as the correlation value becoming a reference of high or low correlation. SAD can be obtained by the following equation:

$$SAD = \sum_{x \in B_D} |f(x, N) - f(x+d, N-1)| \quad (1)$$

where x indicates a position of pixel in a frame, $B_D$ a "low correlation" region (a set of pixel positions) of a low correlation determined block, N the frame number, d a motion vector, and f(x, N) a luminance component of an object pixel. In other words, in equation (1), d that SAD becomes the smallest indicates a motion vector MV from the N-th frame to (N−1)-th frame, and the block on the previous (N−1)-th frame that is indicated by the motion vector MV becomes a corresponding block. MPC can be obtained by the following equation:

$$MPC = \sum_{x \in B_D} a(x, N) \quad (2)$$

$$a(x, N) = \begin{cases} 1 & (|f(x, N) - f(x+d, N-1)| < Th) \\ 0 & (\text{otherwise}) \end{cases} \quad (3)$$

Equations (2) and (3) obtain the number of pixels that the absolute value difference of the luminance component in a block is smaller than the threshold Th. In other words, in equations (2) and (3), d that MPC becomes the maximum indicates a motion vector MV from the N-th frame to the (N−1)-th frame, and the block on the previous (N−1)-th frame that is indicated by the motion vector MV becomes a corresponding block.

In the first recursive process (n=1), all pixels of the low correlation determined block are "low correlation", so that a correlation operation similar to a conventional block matching is done.

In correlation determining step S16, the correlation value between the reference block of the N-th frame and the corresponding block of the (N−1)-th frame that are the low correlation determined blocks $B_D(n-1)$ is derived for each of the pixels that are low correlation in each of the low correlation determined blocks $B_D(n-1)$. The pixels of the low correlation determined block $B_D(n)$ that correspond to the high correlation are changed to "high correlation". In the present embodiment, the correlation value is assumed an absolute value difference.

Figure 5:
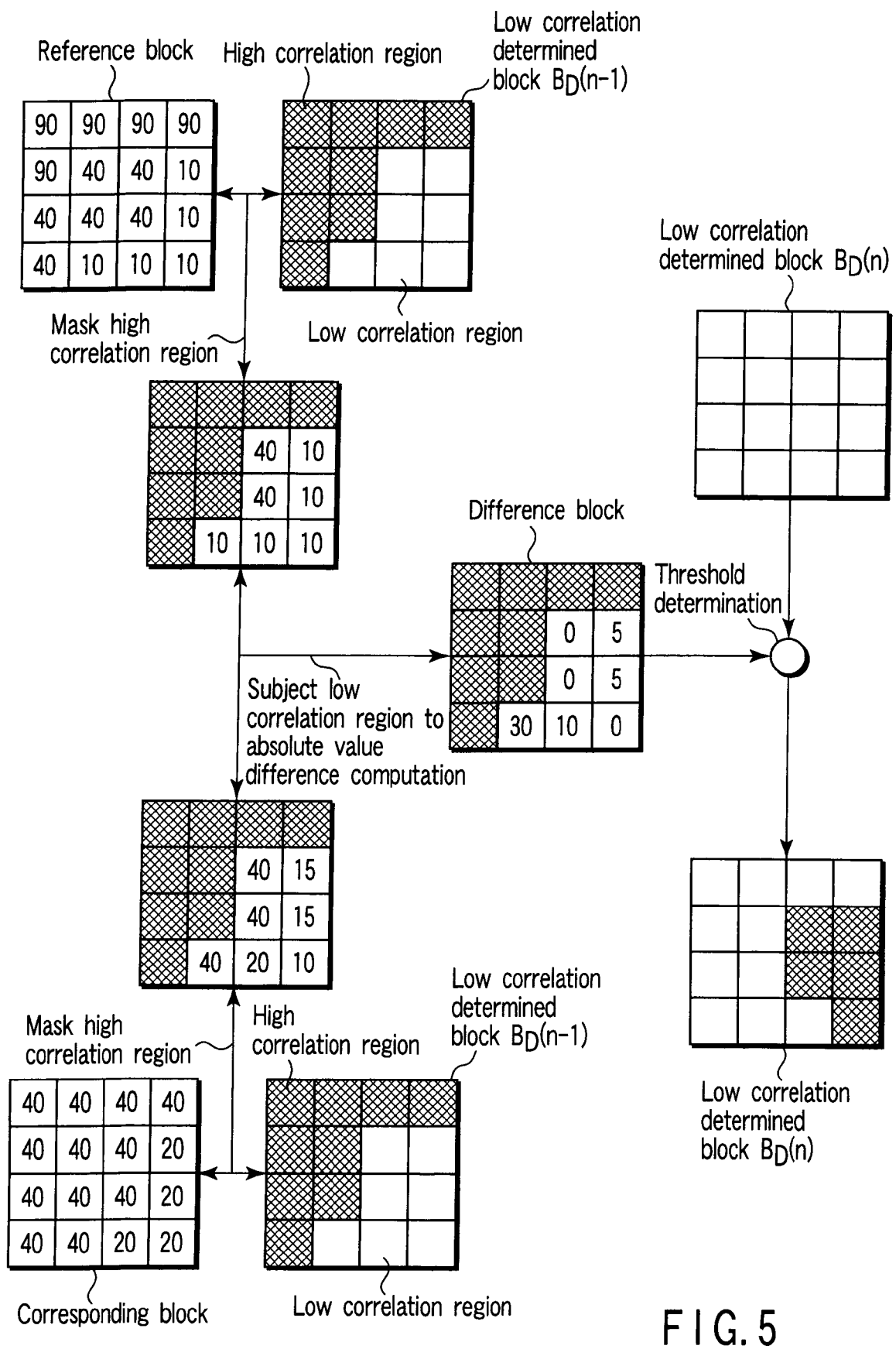
FIG. 5 is a diagram for explaining an operation of a high correlation determining step according to the first embodiment.

FIG. 5 shows an output process of the low correlation determined block $B_D(n)$ of 4×4 pixels in horizontal and vertical directions. The numerical values described in the reference block and the corresponding block show luminance components of pixels, respectively. The high correlation regions of the reference block and corresponding block are masked in accordance with the low correlation determined block $B_D(n-1)$. An absolute value difference operation is done only for the "low correlation" regions to obtain a difference block. The pixels in the difference block that absolute value difference is operated are compared with a threshold. The pixels of the low correlation determined block $B_D(n)$ corresponding to the pixels that are less than the threshold value are changed to "high correlation".

FIG. 5 shows a process of generating the low correlation determined block $B_D(n)$ when the threshold is set at 5. In this time, it is possible to set the whole of the low correlation determined block $B_D(n)$ at "low correlation", when the correlation between the reference block and the corresponding block is very low. In other words, when SAD between the reference block and the corresponding block is very large or when MPC is very small, it is determined that the precision of the motion vector is low, and the whole of the low correlation determined block $B_D(n)$ is set at "low correlation". This makes it possible to remove a small "high correlation" region of the low correlation determined block that is conceivable as error determination in the correlation operation every pixel.

In the motion compensation step S17, the pixels of the reference block corresponding to the pixels becoming "high correlation" in the low correlation determined block $B_D(n)$ are subjected to motion compensation using the motion vector MV derived in the motion estimation step S15 to obtain interpolation frame candidates. Various motion compensation methods are conceivable. However, a method of pasting an object region on an interpolation frame candidate in accordance with a motion vector is applied in the present embodiment. This motion compensation method is described in detail hereinafter.

Figure 6:
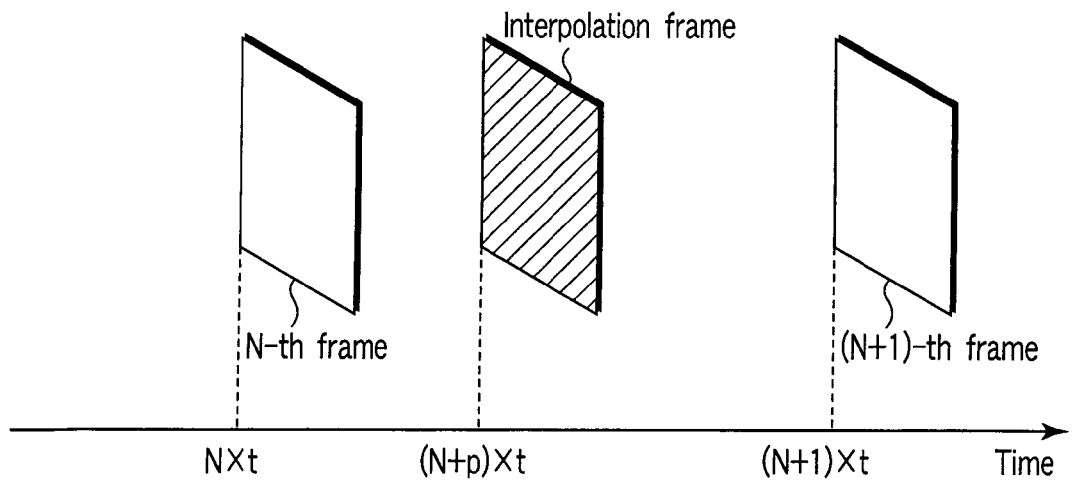
FIG. 6 is a diagram showing a relation between an input frame and an interpolation frame.
Figure 7:
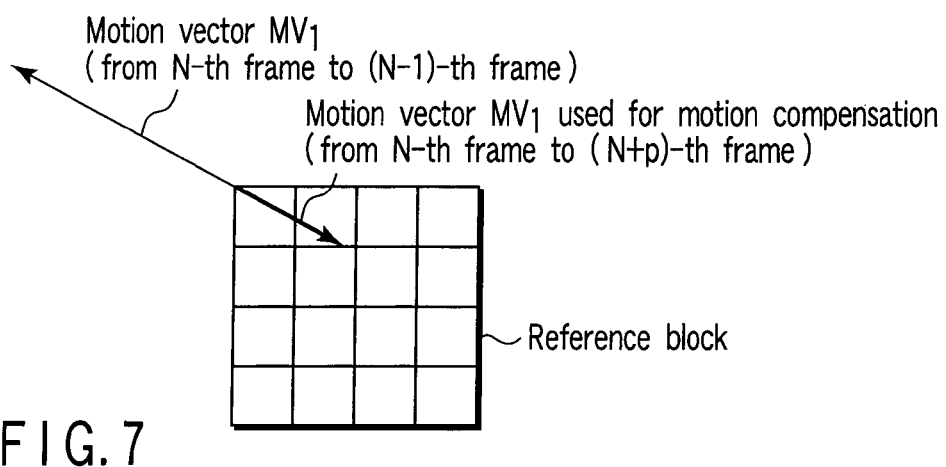
FIG. 7 is a diagram for explaining scaling of a motion vector.

The motion vector MV derived in the motion estimation step S17 is a motion vector between input frames, so that scaling of a motion vector is necessary to obtain an interpolation frame candidate by motion compensation. There is assumed a case to generate an interpolation frame candidate at a position to divide a distance between the N-th frame and the (N+1)-th frame into p:1−p (0<p<1) as shown in FIG. 6. When the motion vector from the reference block of the N-th frame to the corresponding block of the (N−1)-th frame is assumed MV1, the motion vector MV1 is reversed and scaled according to a distance from the N-th frame to convert it into a motion vector MV1 from the N-th frame to the (N+p)-th frame as shown in FIG. 7. This conversion is expressed by the following equation.

$$MV_1 = -pMV_1 \quad (4)$$

Figure 8:
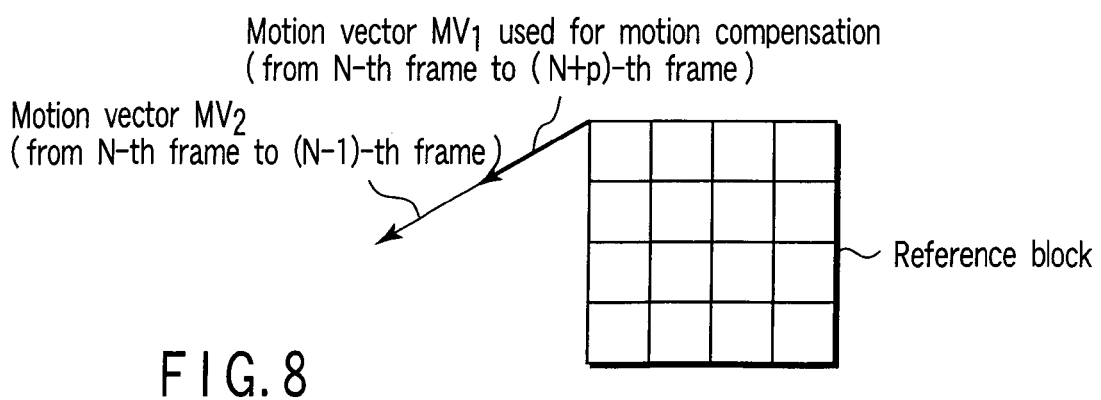
FIG. 8 is a diagram for explaining scaling of a motion vector.

Similarly when the motion vector from the N-th frame to the (N+1)-th frame is assumed MV2, it is necessary to do scaling as shown in FIG. 8. This conversion is expressed by the following equation.

$$MV_1 = pMV_2 \quad (5)$$

In addition, with the motion vector MV3 from the (N+1)-th frame to the N-th frame and the motion vector MV4 from the (N+1)-th frame to the (N+2)-th frame, it is necessary to subject them to scaling according to a distance from the (N+1)-th frame to the (N+p)-th frame. In this case, the motion vector MV1 is derived by the following equation.

$$MV_1 = (1-p)MV_3 \quad (6)$$

$$MV_1 = -(1-p)MV_4 \quad (7)$$

In the present embodiment, p is 0.5 for the purpose of interpolating an interpolation frame candidate at a temporal center position between the N-th frame and the (N+1)-th frame.

As discussed above, after each motion vector is subjected to scaling to obtain a motion compensated motion vector, the pixel on the reference block is pasted on an interpolation candidate in accordance with the motion vector. Assuming that the pixel of the position X of the reference frame is P(X), the pixel of the position X of the candidate interpolation frame is I(X), and the "high correlation" region of the low correlation determined block is $B_A$, the reference frame is pasted on the interpolation frame candidate in accordance with the following equation.

$$I(X+MV_1)=P(X)(X \epsilon B_A) \quad (8)$$

When the pasting is done in this way, the pasted regions might be overlapped to each other or aperture might occur between the pasted regions. However, in the case, the averaging of the overlapped regions or extraction of a median of the overlapped regions is preferable. Further, the region to be overlapped later may be overwritten on the previous region. The aperture region may be processed by a mixer described below.

Figure 9:
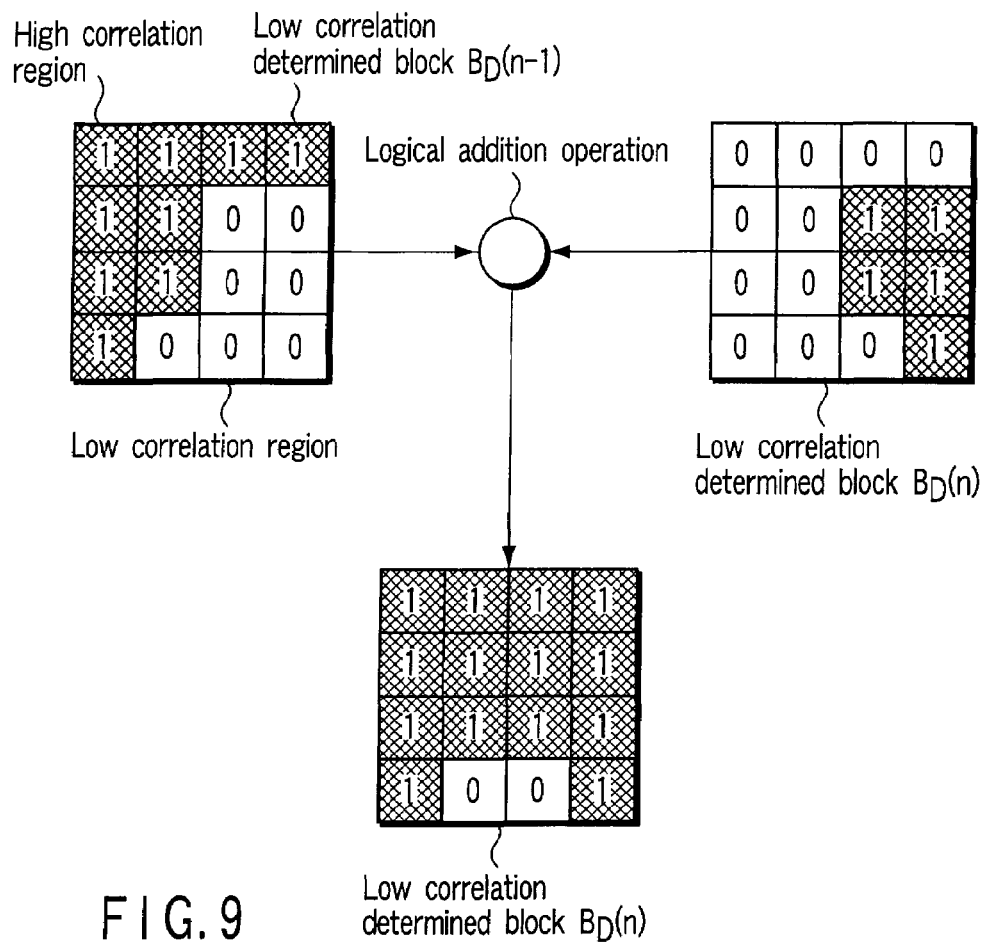
FIG. 9 is a diagram for explaining a step of updating a low correlation determined block in the first embodiment.

In the step S18 of updating the low correlation determined block, the pixels of the low correlation determined block $B_D(n)$ that correspond to the high correlation pixels of the low correlation determined block $B_D(n-1)$ are updated to "high correlation". In other words, when the "high correlation" region of the low correlation determined block is assumed 1, and the "low correlation" region thereof is assumed 0 as shown in FIG. 9, the low correlation determined block $B_D(n)$ can be updated by OR operation of the correlation determined block $B_D(n-1)$ and the low correlation determined block $B_D(n)$.

In step S19, it is determined whether or not the above process is repeated n times. When this determination is NO, n is incremented by 1 (S20), and the process returns to step S14. When the determination in step S19 is YES, it is determined whether or not motion estimation of all blocks is completed. When this determination is NO, i is incremented by 1 (S22) and the process returns to step S12. When the determination in step S21 is YES, the process is finished.

The operation of the mixer 15 will be described hereinafter. The mixer 15 mixes a plurality of interpolation frame candidates acquired by the motion estimators $13_1$-$13_4$ and the motion compensators $14_1$-$14_4$ to produce a mixed interpolation frame. The mixing method of interpolation frame candidates will be described hereinafter.

The mixer 15 executes two steps, that is, a mixing step and a padding step. At first the mixing step will be described. With each pixel of the interpolation frame candidate derived by each of the motion estimators $13_1$-$13_4$ and motion compensators $14_1$-$14_4$, the mixed interpolation frame is acquired using only the motion compensated pixel. In other words, the region not determined to be "high correlation" by the recursive processing of each of the motion estimators $13_1$-$13_4$ and the aperture region occurred on the interpolation frame candidate in each of the motion compensators $14_1$-$14_4$ are not included as a mixture candidate. Accordingly, in the present embodiment, no mixture candidate, one mixture candidate, two mixture candidates and three or more mixture candidates are provided for each pixel.

When the mixture candidate is 0, the pixel is not subjected to mixing and held as aperture on the mixed interpolation frame. When only one candidate is provided, the candidate is pasted on the mixed interpolation frame. When two candidates are provided, the two candidates are averaged, and the averaged candidate is pasted on the mixed interpolation frame. When three or more candidates are provided, the average of all candidates or a median of the candidates is obtained, and the average or the median is pasted on the mixed interpolation frame. If the number of candidates is even, the pixels of two central candidates may be averaged and pasted on the mixed interpolation frame.

The process cost for obtaining the median of the candidates increases in throughput in comparison with the averaging processing. However, the process can remove errors occurred in the candidates accidentally, so that it is desirable in a point to improve picture quality of the mixed interpolation frame. In other words, when four candidate pixel values are 10, 50, 53 and 54, respectively, the candidate pixel of 10 indicates value obviously different from other candidates. It is very likely that they occurred as an error in motion compensation. However, when the median is extracted, the average of the pixels 50 and 53 is adopted. Therefore, the error candidate 10 does not affect the mixed interpolation frame. The median process is generally used for removing a noise contained in an image. This is a process using such a tendency that candidates having tendency different from other candidates gather on both ends of a permutation, when the candidates are aligned in an ascending order or a descending order. The mixing of interpolation frames is done by executing the above process for all pixels of the interpolation frame candidate.

The padding step will be described hereinafter. In the above mixing process, the pixel whose candidate is 0 is not pasted on the mixed interpolation frame. Such a pixel may be interpolated from a spatial direction. In other words, an average of 4 or 8 pixels neighboring to an interest pixel which is not pasted on the mixed interpolation frame or a median of them is pasted on the interest pixel. Because the number of pixels of the mixed interpolation frame that are not pasted thereon is few, it is possible to bury aperture of the mixed interpolation frame by the above process.

At last, the mixed interpolation frame is inserted at a target temporal position of the input frame by the interpolation frame inserting unit. In the present embodiment, since the number of frames is doubled, the mixed interpolation frame may be inserted at a temporal half position of a time interval between the input frames.

Figure 10:
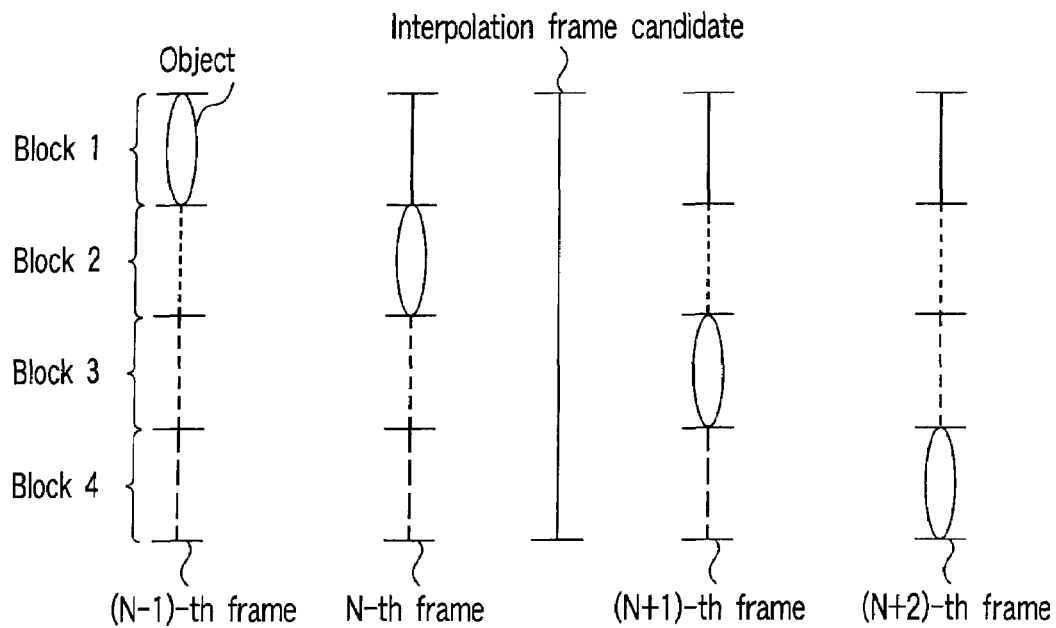
FIG. 10 is a diagram of explaining an interpolation frame generating method of the present embodiment.

The effect of the interpolation frame generating method of the present embodiment will be described. For simplicity, the effect will be described using a model that an object moves on a one-dimensional static image as shown in FIG. 10. The vertical line of FIG. 10 represents a one-dimensional image of from the (N−1)-th frame to the (N+2)-th frame, and an oval represents a moving object. The sections of a vertical line divided by horizontal lines represent blocks, that is, blocks 1, 2, 3 and 4. The motion estimation from the N-th frame to the (N+1)-th frame is noticed. The block 1 on the N-th frame has a block corresponding to the position on the (N+1)-th frame, so that a motion vector can be obtained as shown by an arrow in FIG. 11.

Figure 11:
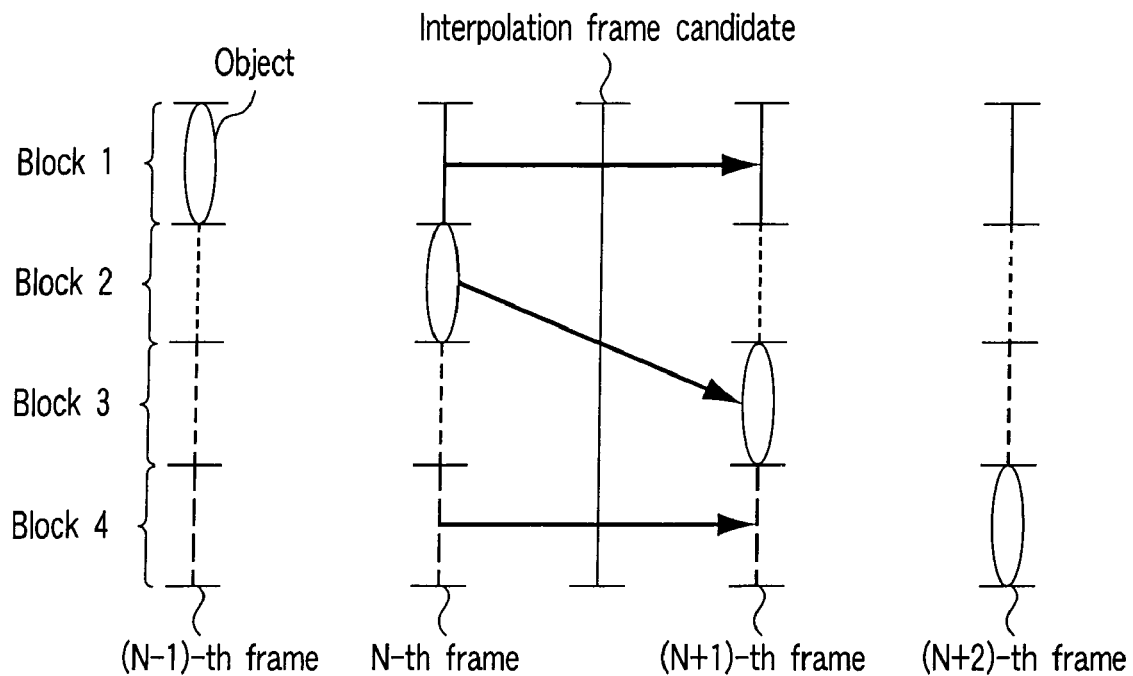
FIG. 11 is a diagram of explaining an interpolation frame generating method of the present embodiment.
Figure 12:
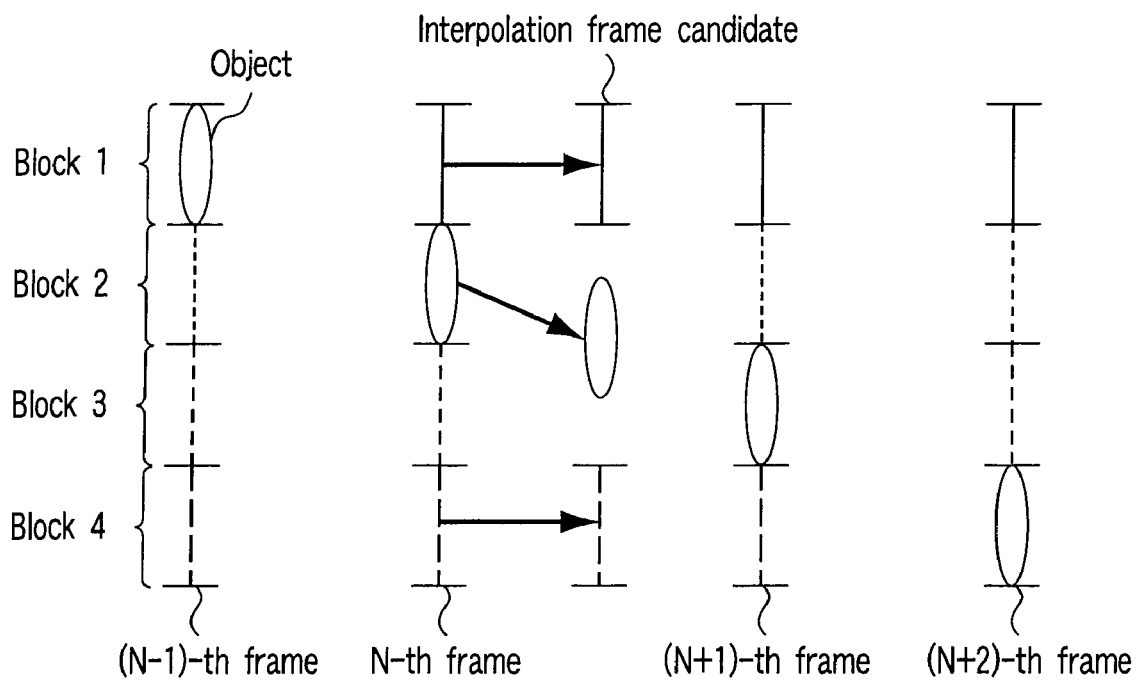
FIG. 12 is a diagram of explaining an interpolation frame generating method of the present embodiment.

The blocks 2 and 4 have corresponding blocks on the (N+1)-th frame, too, so that a motion vector can be obtained as shown in FIG. 11. However, the block 3 has no corresponding block on the (N+1)-th frame. Therefore, a correct motion vector cannot be obtained. Accordingly, the motion estimator 13 obtains a motion vector of a suitable position for the block 3. However, almost pixels are determined as "low correlation" in the correlation determination step of the motion estimator 13. Therefore, when motion compensation is done in the motion compensation step, the blocks 1, 2 and 4 are pasted on an interpolation frame candidate as shown in FIG. 12. However, the block 3 is not pasted on the interpolation frame candidate and has aperture as shown in FIG. 12, because almost pixels of the block 3 are low correlation.

Figure 13:
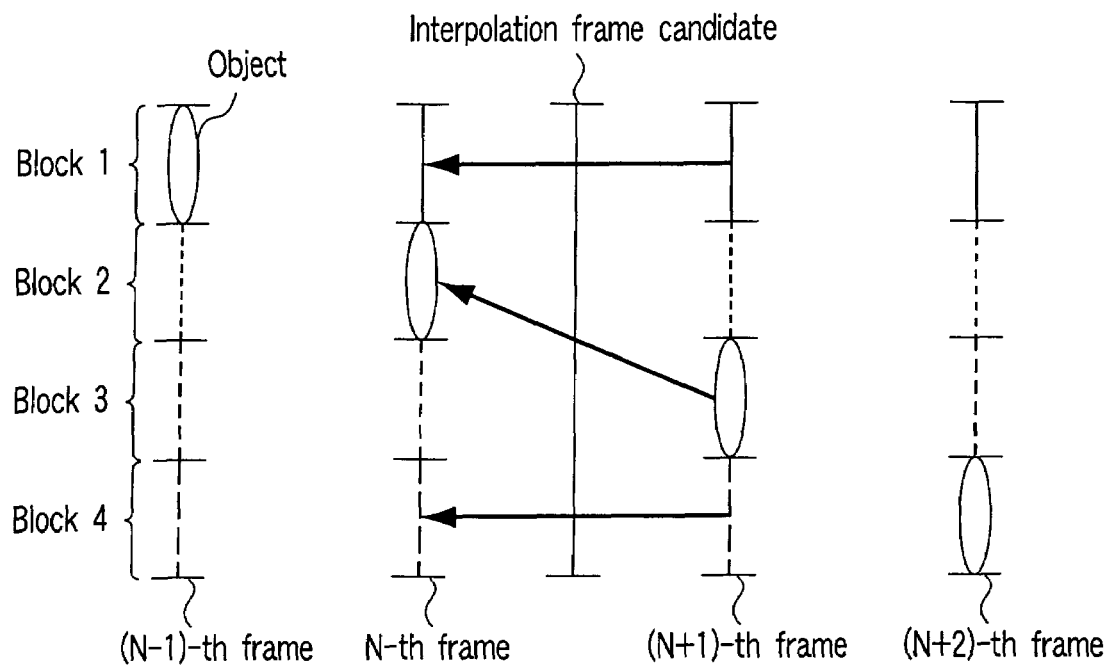
FIG. 13 is a diagram of explaining an interpolation frame generating method of the present embodiment.
Figure 14:
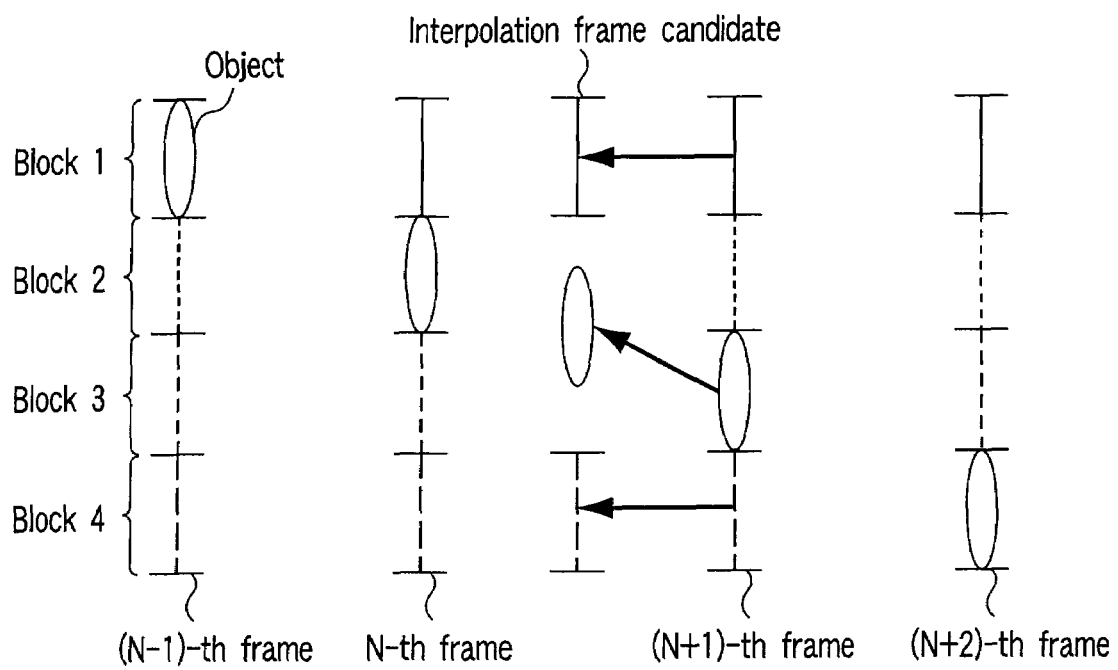
FIG. 14 is a diagram of explaining an interpolation frame generating method of the present embodiment.

Similarly, in the motion estimation from the (N+1)-th frame to the N-th frame, motion vectors with respect to the blocks 1, 3 and 4 on the (N+1)-th frame can be obtained as shown in FIG. 13, because corresponding blocks exist on the N-th frame. However, the almost pixels of the block 2 on the (N+1)-th frame are "low correlation" because no corresponding frame is on the N-th frame. As a result, the interpolation frame candidate shown in FIG. 14 can be obtained.

Figure 15:
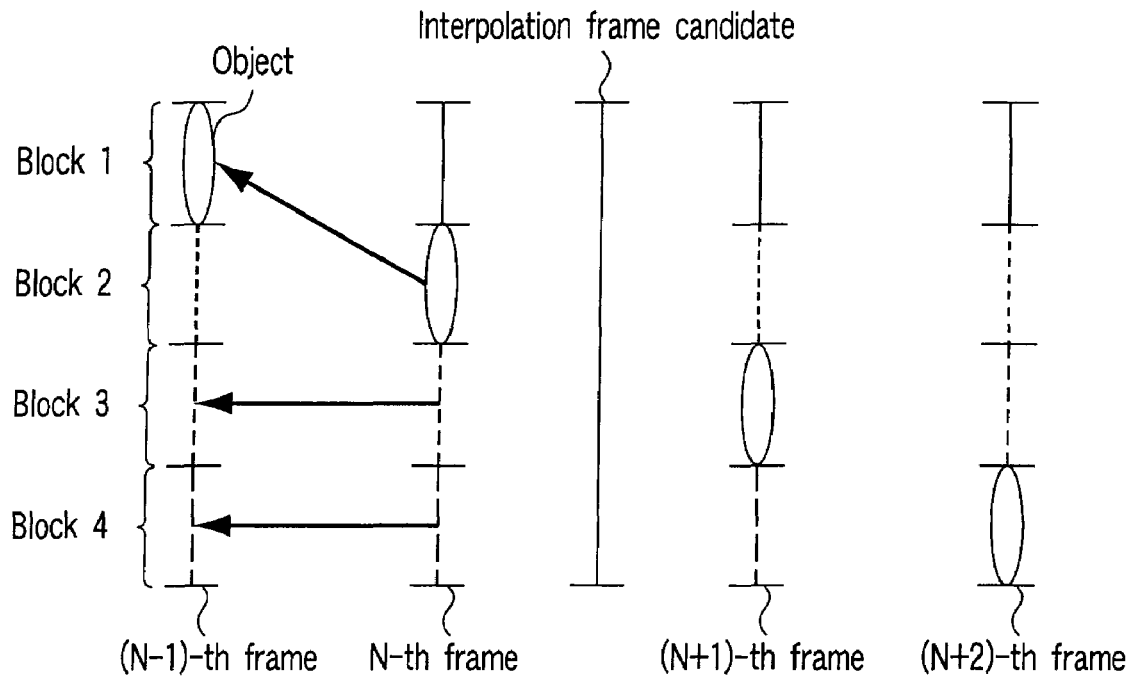
FIG. 15 is a diagram of explaining an interpolation frame generating method of the present embodiment.
Figure 16:
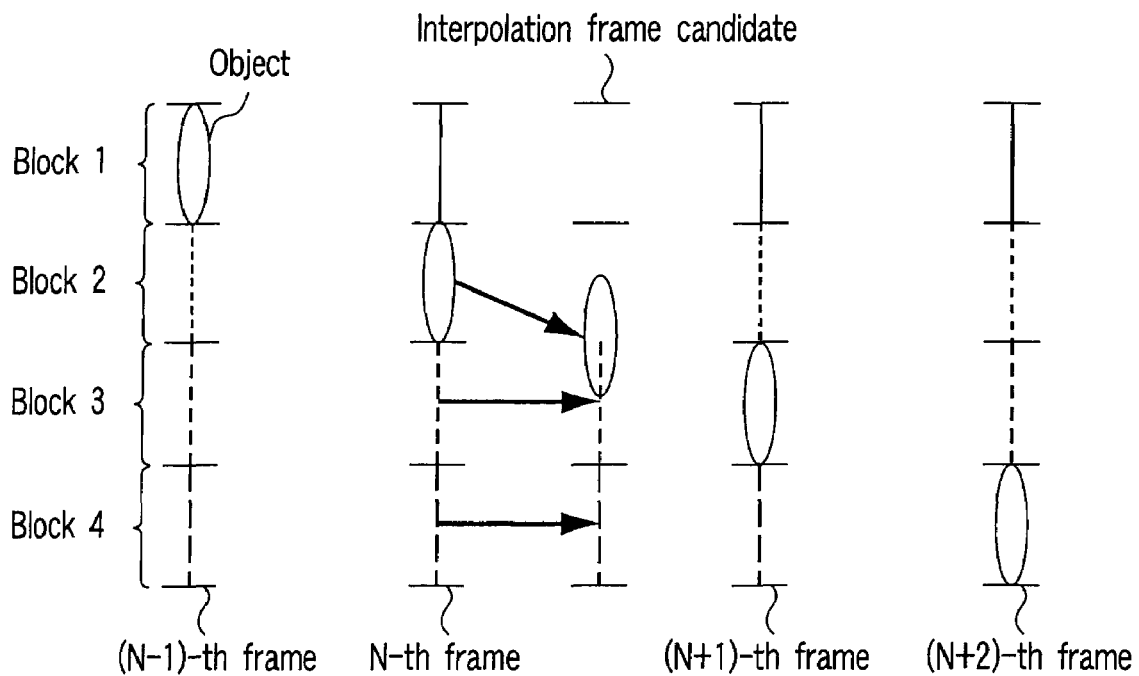
FIG. 16 is a diagram of explaining an interpolation frame generating method of the present embodiment.

Similarly, in the motion estimation from the N-th frame to the (N−1)-th frame, too, the block 1 of the N-th frame has no corresponding block as shown in FIG. 15, so that almost all pixels are "low correlation". Therefore, aperture remains in the interpolation frame candidate as shown in FIG. 16. The blocks overlap on the interpolation frame candidate due to motion compensation of the blocks 2 and 3. However, this region is an average of an object and a background.

Figure 17:
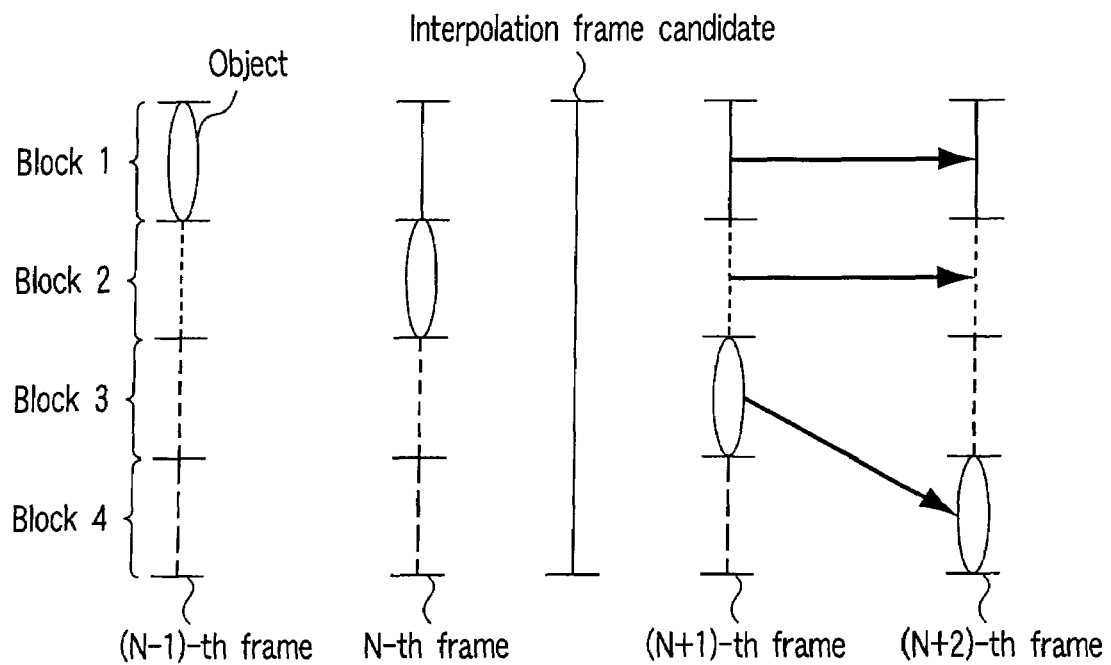
FIG. 17 is a diagram of explaining an interpolation frame generating method of the present embodiment.
Figure 18:
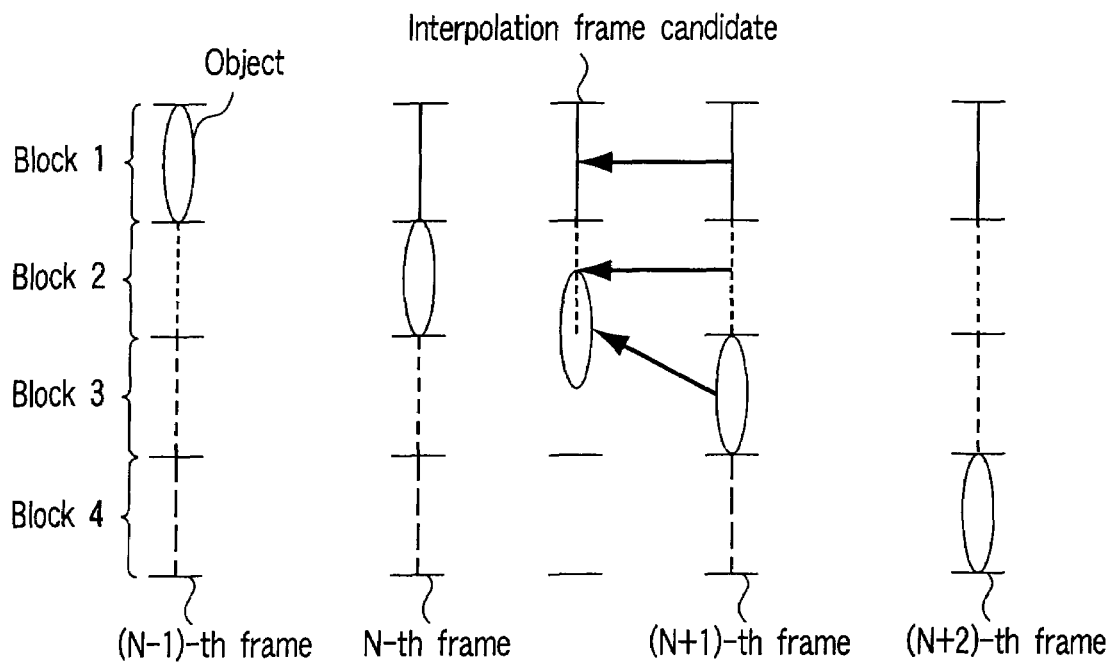
FIG. 18 is a diagram of explaining an interpolation frame generating method of the present embodiment.

Similarly, in motion estimation from the (N+1)-th frame to the (N+2)-th frame, too, since the block 4 of the (N+1)-th frame has no corresponding block, almost pixels thereof are low correlation as shown in FIG. 17. Therefore, aperture occurs in an interpolation frame candidate as shown in FIG. 18. The blocks overlap on the interpolation frame candidate due to motion compensation of the blocks 2 and 3. However, this region is an average of an object and a background.

The mixer 15 mixes the interpolation frames generated as described above. The mixing state is described in conjunction with FIG. 19. In the block 1, three frames are correctly interpolated by motion estimation and motion compensation, and one frame has aperture. Because all other frames than the frame having the aperture are correct interpolation frame candidates, a correct block is pasted on the mixed interpolation frame. The block 4 is similar to the block 1.

Figure 19:
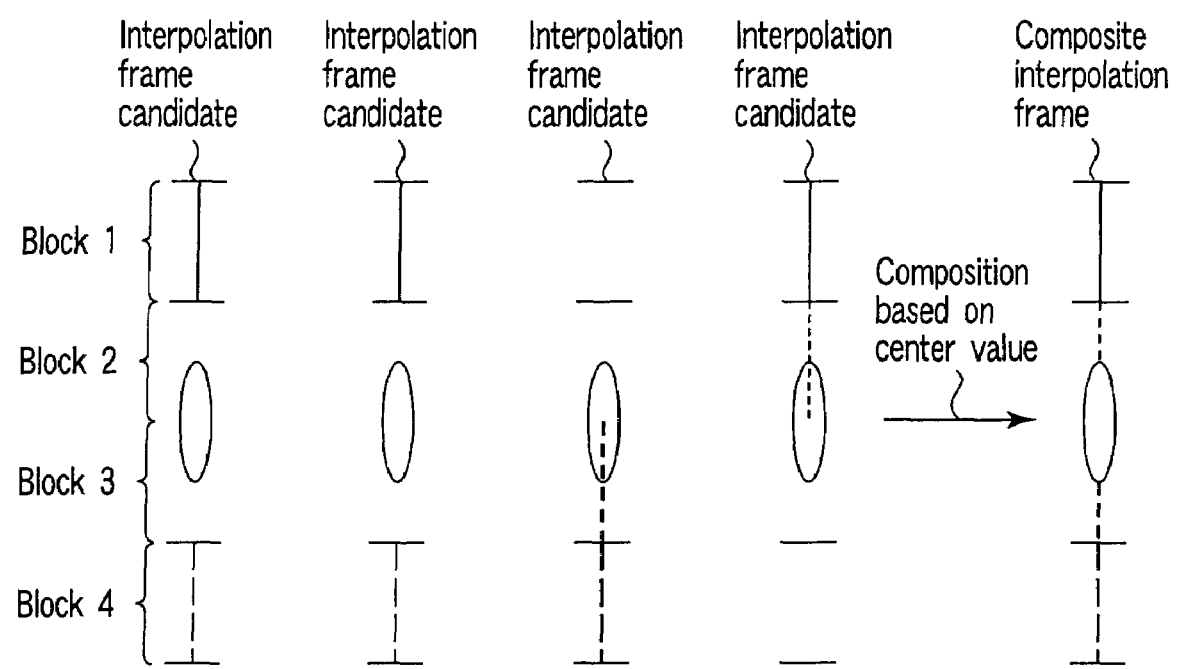
FIG. 19 is a diagram of explaining an interpolation frame generating method of the present embodiment.

In the block 2, according to regions in which an object exists, there are three frames wherein the object is correctly interpolated i, and there is a frame wherein a background and the object are averaged. When a median is obtained, the median becomes always an object because there are three frames wherein the object is correctly interpolated. Accordingly, the frame wherein the error object and background are averaged is not selected. For this reason, the object is pasted correctly on the mixed interpolation frame. The background region of the block 2 has one region correctly interpolated and three regions remaining as aperture. Thus, the background region correctly interpolated is pasted on the mixed interpolation frame. The block 3 is similar to the block 2. As a result, the correct interpolation frames are mixed as shown in FIG. 19.

The above describes an ideal operation. However, even if, for example, an error occurs to an interpolation frame candidate with the block 1, if remaining frames is correctly interpolated, it is possible to generate a mixed interpolation frame without affect of a certain error of motion estimation and motion compensation, resulting in improving a robust.

In the present embodiment, there is described a configuration to generate an interpolation frame using four total frames, i.e., two forward frames and two backward frames between which the interpolation frame is to interpolated. In the case of the system that delay from input to display is not permitted, an interpolation frame is produced using three frames: one frame before an interpolation frame insertion point and two frames after the point. In other words, the motion estimator $13_1$ performs motion estimation from the N-th frame to the (N−1)-th frame, the motion estimator $13_2$ performs the motion estimation from the N-th frame to the (N+1)-th frame, and the motion estimator $13_3$ performs the motion estimation from the (N+1)-th to the N-th frame. The motion estimator $13_4$ is not used. According to this method, delay can be decreased in comparison with a case of using four frames. In this case, since the interpolation frame candidate explained by FIGS. 17 and 18 is not produced, in the case of the mixing explained in FIG. 19, one interpolation frame candidate is lost, and a unilateral hidden surface among hidden surfaces above and below an object is not reproduced. Therefore, when an interpolation frame is produced using three frames, an effect to reproduce the hidden surface is small in comparison with four frames. However, it is possible to reproduce a unilateral hidden surface by at least the object in comparison with generation of interpolation frame using two frames as a conventional method.

When the frame rate of the input frame is large, it is possible to improve further robust by means of not two frames before and after the interpolation frame producing position but three frames or more before and after the position. When the input frame rate is large, correct motion estimation can be carried out because transformation of the object is small in a frame separated from an interpolation frame position in terms of time. Therefore, it is possible to increase in number the candidate interpolation frames by using three frames or more before and after the interpolation frame producing position, resulting in improving a robust in mixed interpolation frame generation.

For the purpose of improving precision of a mixed interpolation frame, when a plurality of interpolation frame candidates are mixed, they are weighted according to a temporal distance between a position at which an interpolation frame is interpolated and a frame position with respect to which a motion vector is derived. In other words, when interpolation frames between the N-th frame and the (N+1)-th frame are mixed using four frames from the (N−1)-th frame to the (N+2)-th frame as shown in FIG. 2, the interpolation frame candidate (corresponding to FIGS. 12 and 14) subjected to a motion compensation using a motion vector obtained by motion estimation between the N-th frame near to an interpolation frame position and the N+1 frame is weighted larger than the interpolation frame candidate (corresponding to FIGS. 16 and 18) subjected to a motion compensation using a motion vector from the N-th frame far from an interpolation frame position to the (N−1)-th frame and a motion vector obtained by motion estimation from the (N+1)-th frame to the (N+2)-th frame, and the weighted interpolation frame candidates are mixed. This is because the interpolation frame candidate using a motion vector between the frames near temporally with respect to an interpolation frame inserting position is predicted to have a higher precision than the interpolation frame candidate using a motion vector between the frames far temporally from the position.

How to give weighting rates at the time of mixing is as follow. If the interpolation frame candidates are averaged and mixed, the weighted average may be used. If they are mixed using a median, the candidates to which the weighting is to be increased may be increased in number and mixed. Concretely, if the pixels of the interpolation frame candidates to be mixed are four pixels P0, P1, P2 and P3, and the weighting of the pixels P1 and P2 should be doubled, in the case of average mixing, the pixels may be weighted as (P0+2×P1+2×P2+P3)/6. In the case of median mixing, apparent six candidates, that is, P0, P1, P1, P2, P2 and P3 may be obtained as the median.

According to the present embodiment, a correct interpolation frame is obtained on the occlusion region that cannot estimate movement by motion estimation between two frames. It is possible to generate a correct interpolation frame with a comparative robust by mixing a plurality of interpolation frame candidates. According to the present invention, an interpolation picture between two pictures can be obtained with good precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer readable storage medium storing instructions of a computer program which when executed by a computer results in performance of steps comprising:
    dividing each of a first reference image of an input video and a second reference image thereof into a plurality of reference regions each including a plurality of pixels,
    executing a correlation operation between the first reference image and each of at least two first destination images located before and after the first reference image in terms of time and a correlation operation between the second reference image and at least one second destination image corresponding to the second reference image to derive a plurality of motion vectors between the first reference image and each of the first destination images, and a plurality of motion vectors between the second reference image and the second destination image, for each reference region of the reference regions;
    obtaining a correlation value between the reference region and a corresponding region of at least one of the first destination images and the second destination image that is indicated by each of the motion vectors to determine the reference region as a high correlation region or a low correlation region;
    generating a plurality of interpolation image candidates between the first reference image and the second reference image using the reference region determined as the high correlation region; and
    mixing the plurality of interpolation image candidates to produce an interpolation image.

2. The computer readable storage medium according to claim 1, wherein executing the correlation operation includes executing a correlation operation between the first reference image and the two first destination images located before and after the first reference image in terms of time and a correlation operation between the second reference image and the two second destination images located before and after the second reference image in terms of time for each of the reference images to derive the plurality of motion vectors between the first reference image and each of the first destination images, and the plurality of motion vectors between the second reference image and the second destination images, for each of the reference regions.

3. The computer readable storage medium according to claim 1, wherein the reference regions includes a square block region formed of a plurality of pixels arranged in horizontal and vertical directions.

4. The computer readable storage medium according to claim 1, wherein executing the correlation operation includes deriving the motion vectors by block matching from the reference image to the destination image.

5. The computer readable storage medium according to claim 1, wherein the obtaining the correlation value includes determining an absolute value difference between the reference region and the corresponding region every pixel as the correlation value.

6. The computer readable storage medium according to claim 1, wherein the mixing includes obtaining a median of the interpolation image candidates for each of the pixels and pasting the median on the interpolation image.

7. The computer readable storage medium according to claim 1, wherein the obtaining the correlation value includes obtaining a correlation value between the reference region and the corresponding region and determining the whole of the reference region as low correlation when the correlation is low.

8. The computer readable storage medium according to claim 1 further comprising executing recursively the steps of executing the correlation operation, obtaining the correlation value and generating the interpolation image candidate, using the low correlation region.

9. The computer readable storage medium according to claim 1, wherein the mixing includes obtaining a weighted median that weighted each pixel of the interpolation image candidate increases as a temporal distance between the interpolation image and the reference images or the destination images increases, the weighted median pasted on the interpolation image.

10. A computer readable storage medium storing instructions of a computer program which when executed by a computer results in performance of steps comprising:
    dividing each of a first image of an input video and a second image thereof into a plurality of regions;
    performing motion estimation from the first image to the second image in units of region to derive a motion vector;
    performing, in units of region, motion estimation from the first image to a third image opposite to the second image in terms of time using the first image as a reference;
    performing motion estimation from the second image to the first image in units of region;
    obtaining a correlation value with respect to a region indicated by the motion vector to determine a high correlation region or a low correlation region;
    generating an interpolation image candidate between the first image and the second image using the high correlation region; and
    mixing a plurality of interpolation image candidates to produce an interpolation image.

11. The computer readable storage medium according to claim 10, which includes executing motion estimation from the second image to a fourth image opposite in terms of time to the first image using the second image as a reference.

* * * * *